(12) United States Patent
Soller et al.

(10) Patent No.: US 11,888,362 B2
(45) Date of Patent: Jan. 30, 2024

(54) METHOD TO MANUFACTURE AN ELECTRIC MACHINE, INSTALLATION, VEHICLE

(71) Applicants: Thomas Soller, Bayern (DE); Rolf Vollmer, Gersfeld (DE); Carsten Schuh, Baldhams (DE)

(72) Inventors: Thomas Soller, Bayern (DE); Rolf Vollmer, Gersfeld (DE); Carsten Schuh, Baldhams (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 9 days.

(21) Appl. No.: 17/460,486

(22) Filed: Aug. 30, 2021

(65) Prior Publication Data
US 2022/0069680 A1    Mar. 3, 2022

(30) Foreign Application Priority Data
Aug. 31, 2020 (EP) .................... 20193708

(51) Int. Cl.
*H02K 15/02*  (2006.01)
(52) U.S. Cl.
CPC .................. *H02K 15/02* (2013.01)
(58) Field of Classification Search
CPC ........ B22F 10/10; B22F 2998/10; B22F 3/10; B22F 3/22; B22F 7/06
See application file for complete search history.

(56) References Cited

U.S. PATENT DOCUMENTS

| | | | | |
|---|---|---|---|---|
| 2007/0079497 A1* | 4/2007 | Meacham | ........... | F16C 32/0468 29/598 |
| 2008/0173386 A1* | 7/2008 | Clark | ................ | B23K 20/02 427/430.1 |
| 2022/0069680 A1* | 3/2022 | Soller | .................. | B33Y 80/00 |

FOREIGN PATENT DOCUMENTS

| | | |
|---|---|---|
| DE | 102012015127 A1 | 2/2014 |
| DE | 102014104596 A1 | 10/2015 |
| EP | 3653320 A1 | 5/2020 |
| WO | 2020043565 A1 | 3/2020 |
| WO | 2020064299 A1 | 4/2020 |

OTHER PUBLICATIONS

European Search Report for European Application No. 20193708.3-1103 dated Jan. 28, 2021.

* cited by examiner

*Primary Examiner* — Minh N Trinh
(74) *Attorney, Agent, or Firm* — Lempia Summerfield Katz LLC

(57) ABSTRACT

A method for manufacturing an electric machine having a stack of magnetic laminations including a stack of green blanks. A first green blank of the stack is printed. A separating layer is applied to the first green blank. At least a second green blank of a magnetic lamination is printed onto the first green blank with the separating layer. The green blanks are jointly sintered.

8 Claims, 3 Drawing Sheets

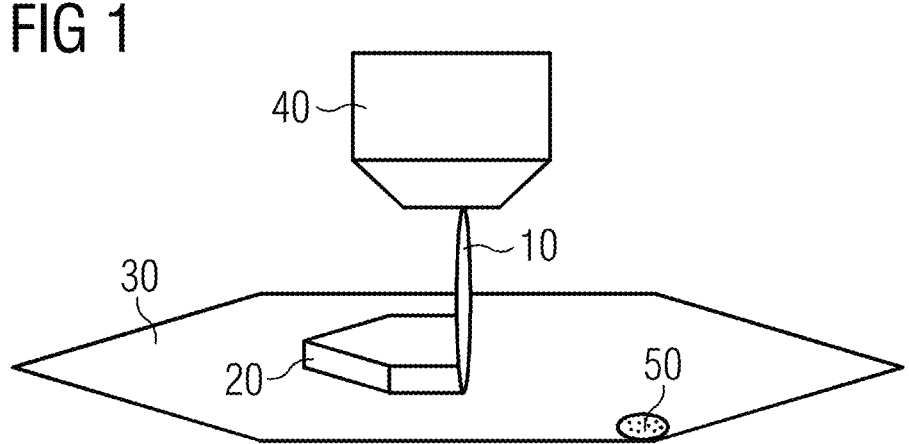
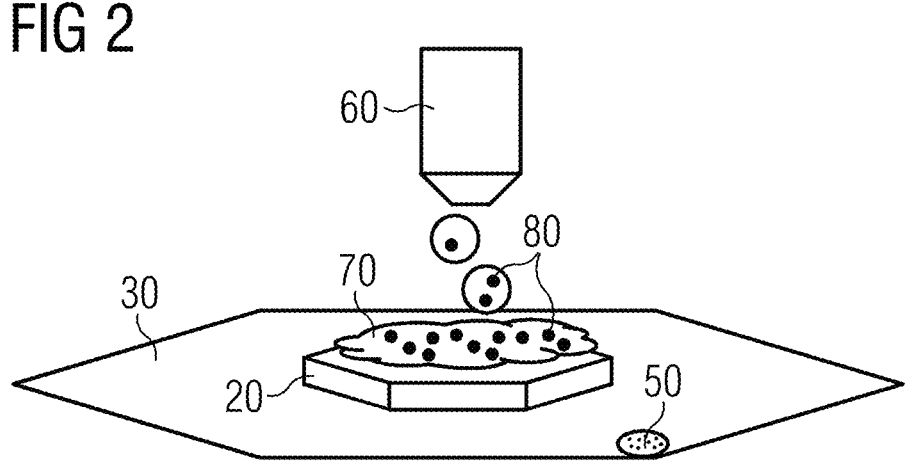

METHOD TO MANUFACTURE AN ELECTRIC MACHINE, INSTALLATION, VEHICLE

CROSS REFERENCE TO RELATED APPLICATIONS

This patent document claims the benefit of EP 20193708.3 filed on Aug. 31, 2020 which is hereby incorporated in its entirety by reference.

FIELD

Embodiments relate to a method for manufacturing an electric machine including a stack of magnetic laminations.

BACKGROUND

One method for producing magnetic laminations for electric machines constitutes the printing of magnetic laminations. A printing paste is created from metal powders, for example from pure iron powders. Subsequently, the printing paste is then processed by a printing technique to form a green body (also referred to as a green blank) in the form of a thick layer, and finally the resulting green body is transformed into a metal lamination by thermal treatment, i.e., binder removal and sintering. For use in an electric machine, the individual magnetic laminations then have to be provided with an insulating layer and laminated to form a stack of laminations.

For a single stack of laminations, several thousand individual magnetic laminations may be required. The manufacturing steps required for this, for example transport, storage, fitting and removal, for such a high number of individual components during the thermal processing and the separate after-treatment thereof are complex and expensive.

BRIEF SUMMARY AND DESCRIPTION

The scope of the present invention is defined solely by the claims and is not affected to any degree by the statements within this summary. The present embodiments may obviate one or more of the drawbacks or limitations in the related art.

Embodiments provide an improved method for manufacturing an electric machine including a stack of magnetic laminations that may carried out more simply, quickly and cost-effectively.

In the method for manufacturing an electric machine including a stack of magnetic laminations, a stack of green blanks of magnetic laminations is manufactured, wherein a first green blank of the stack is printed, wherein a separating layer is applied to the first green blank, and in which method at least a second green blank of a magnetic lamination is printed onto the first green blank with the separating layer, wherein then the green blanks are jointly sintered.

The green blanks constitute flat parts with two flat sides which face away from one another. The phrase "a separating layer is applied to a green blank" refers to where the separating layer is applied on or to a flat side of the green blank, expediently to a flat side of the green blank that is free in the respective step of the method.

The first green blank and/or the separating layer may be dried before the second green blank is printed.

The method makes it possible to jointly sinter the green blanks, with the result that individual sintering of the green blanks and subsequent assembly to form a stack of magnetic laminations may be omitted. Rather, it is possible firstly to partially or completely print the stack of green blanks and then to sinter the partially or completely printed stack of green blanks. Consequently, the individual magnetic laminations may be sintered in parallel. For example, a complex alignment of sintered individual magnetic laminations within the stack of magnetic laminations is not required. The method provides where a stack of magnetic laminations and thus an electric machine including such a stack of magnetic laminations may therefore be manufactured much more quickly and cost-effectively than by known methods.

The term "magnetic lamination" refers to printed and/or sintered parts. The term "magnetic lamination" may also be replaced by the phrase "material layer or material layer structure formed with magnetic material." The material layer or the material layer structure may be a flat part. The term "magnetic lamination" does not imply a necessary manufacturing step by rolling.

In the method it is not necessary to separately process individual and typically pliable green blanks, with the result that in the method the stack of green blanks and thus also the stack of magnetic laminations may be arranged particularly simply and precisely. A precise arrangement of the magnetic laminations, which is possible, results in a high electrical efficiency of the electric machine manufactured by the method.

In the method the green blanks are printed with a first material, for example a permanently magnetic material or a material which forms permanently magnetic material after the sintering, and/or a second material, for example a metallic and/or magnetizable material or a material which is metallic and/or magnetizable after the sintering. In this way, it is possible to manufacture electric machines with corresponding material properties, for example stacks of two- or multi-component magnetic laminations, more simply and cost-effectively than previously.

In the method, a separating layer is for example applied to the second green blank of the stack, and at least one further green blank of the stack is printed onto the second green blank with the separating layer.

The second green blank and/or the separating layer for example may be dried before a further green blank is printed.

In an embodiment of the method, the method steps explained above undergo one or more repetitions. The further green blank takes the place of the second green blank in each case. In this refinement of the method a separating layer is applied to the respectively last-printed green blank of the stack and at least one further green blank of the stack is printed onto this last-printed green blank with the separating layer, and so forth. In this way, a stack with an arbitrary number of green blanks, for instance with more than one thousand green blanks, may be printed. Therefore, electric machines including more than one thousand magnetic laminations may be manufactured simply and cost-effectively. Correspondingly, specific demands on the electric machines to be manufactured may also be met in a simple way by the method.

Expediently, in the method the magnetic laminations of the stack have an n-fold rotational symmetry and already printed green blanks are rotated by an angle of 360°/n or by a multiple of this angle before a further green blank of the stack is printed with an otherwise unchanged arrangement. The multiple of this angle is for example not a factor of n. In this way, possible deviations of process parameters from ideal process parameters may be compensated. For example, the mean of thickness gradients of individual green blanks along a direction over the entire stack may be taken, with the result that thickness differences of individual green blanks along an entire stack do not add up, but instead compensate for one another. Moreover, for instance, when printing the green blanks, the mean of possibly occurring anisotropies along a movement direction of a printhead may be taken by changing the orientation of the green blanks during the printing continuously from green blank to green blank. Consequently, the precision of the stack of magnetic laminations may be increased and an improved efficiency of the electric machine manufactured may be achieved.

In the method, for example one, more or all of the green blanks are printed by screen and/or stencil printing. By screen and/or stencil printing, it is possible to achieve high precision for example of the shape of the respectively printed green blanks, and therefore precise manufacture of the electric machine and, correspondingly, high efficiency of the electric machine are possible.

Advantageously, in the method the separating layer is for example formed with ceramic particles and/or the separating layer is applied with a green-blank coverage of at least 75 percent and/or the separating layer is formed with aluminum oxide and/or yttrium oxide and/or magnesium oxide and/or with aluminum nitride and/or boron nitride and/or YAG materials and/or mica materials.

Ceramic particles make it possible firstly to keep the green blanks, and consequently also the magnetic laminations resulting from the green blanks, spaced apart. Therefore, the magnetic laminations may be insulated from one another in a simple manner as a result of the spacing. Expediently, the ceramic particles may also serve as sintering inhibitors. Used with particular preference are ceramic particles with a bimodal size distribution, that is to say with a fine fraction and a coarse fraction. The fine fraction suitably takes on the role of a sintering inhibitor and the coarse fraction for example acts as a spacer. Use is advantageously made of ceramic particles with a mean diameter of at most 5 micrometers. The ceramic particles for example include a spherical form. As an alternative, the ceramic particles have a whisker- and/or platelet-shaped form. In this way, the ceramic particles may easily absorb shear forces which arise during the printing or sintering. The largest diameter of the whisker- and/or platelet-shaped ceramic particles amounts to at most 10 micrometers, for example at most 5 micrometers.

The ceramic particles are for example formed with aluminum oxide, $Al_2O_3$, and/or yttrium oxide, $Y_2O_3$, and/or magnesium oxide, MgO, and/or aluminum nitride and/or boron nitride and/or YAG material and/or mica material, or a mixture of the materials mentioned.

In the method, the separating layer is applied, for example sprayed on, by a suspension. The suspension for example is dried before a further green blank is printed. As an alternative or in addition, a separating layer in the form of a green film may be used.

In the method, the stack of green blanks for example undergoes binder removal and/or is sintered to form a stack of magnetic laminations.

In the method, resin is introduced between magnetic laminations of the stack of magnetic laminations, for example in such a way that the resin electrically insulates the magnetic laminations from one another. In this refinement of the method, it is possible to remove the separating layer beforehand or to introduce the resin layer in addition to the separating layer between the magnetic laminations.

In the method, it is suitable for a rotor and/or a stator of the electric machine to be formed with the stack of magnetic laminations.

The installation and/or the vehicle include(s) an electric machine that is produced by a method as explained above. The installation and/or the vehicle includes an electric machine, in which the magnetic laminations of the stack may be arranged one on top of another in a particularly precise manner. Consequently, the installation and the vehicle may be designed in a particularly efficient manner.

BRIEF DESCRIPTION OF THE FIGURES

FIG. 1 schematically depicts a perspective illustration of a first step of the method for manufacturing an electric machine, in which method a first green blank of a magnetic lamination is printed according to an embodiment.

FIG. 2 schematically depicts a perspective illustration of a second step of the method, in which a suspension with ceramic particles is sprayed onto the first green blank according to an embodiment.

FIGS. 1 to 5 are jointly sintered according to an embodiment.

FIGS. 1 to 6 is installed in an electric machine of an installation according to an embodiment.

DETAILED DESCRIPTION

Figure 3:
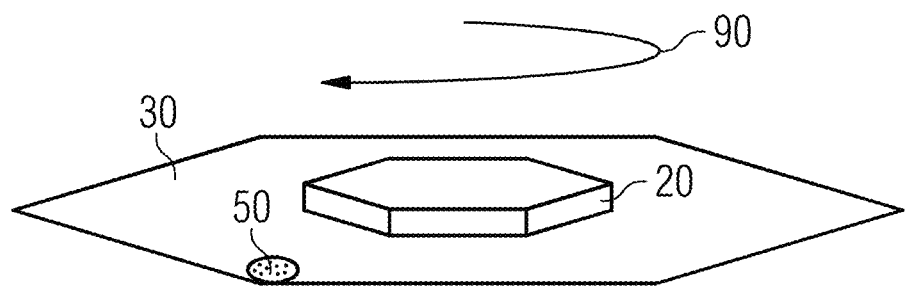
FIG. 3 schematically depicts a perspective illustration of a configuration of the first green blank after the method steps as per FIGS. 1 and 2 according to an embodiment.

The method shown in FIGS. 1 to 7 is a method for manufacturing an electric machine including a stack of magnetic laminations.

In the method, the magnetic laminations are printed in a screen-printing method by stencil printing. To that end, in the method firstly a printing paste 10 is produced from metal powders, in the embodiment illustrated from pure iron powders. A first green body 20 is printed onto a substrate 30 by the printing paste 10.

The green body 20 should form a magnetic lamination after a sintering step, explained in more detail below, and has the form of a thin layer on the substrate 30, with the result that the green body 20 has a lower flat side, with which it makes contact with the substrate 30, and an upper flat side, that faces away from the lower flat side and extends parallel thereto.

In order to print the green body 20, a printing screen (not illustrated explicitly in the drawing) with a stencil (not illustrated explicitly in the drawing) is used, in order to establish the shape of the green body 20 in two-dimensional directions of the substrate 30. A nozzle 40 prints the printing paste 10 through the screen onto the substrate 30. The substrate 30 carries an orientation marking 50, by which the orientation of the substrate 30 and consequently also of the first green body 20 may be easily identified. The first green body 20 and the substrate 30 have a 6-fold rotational symmetry in the embodiment illustrated. In further, not specifically illustrated embodiments, there may be a different rotational symmetry, for instance a 50-fold rotational symmetry or some other rotational symmetry.

After the first green body 20 has been printed, the first green body 20 optionally may be partially or completely dried.

Subsequently, a suspension 70, that contains a volatile carrier liquid and ceramic particles 80 held in the carrier liquid, is sprayed by a nozzle 60 onto the upper flat side of the first green body 20 in the form of a separating layer.

In the embodiment illustrated, the ceramic particles 80 of the suspension 70 have a spherical form and a mean particle diameter of less than 5 micrometers, and are formed with aluminum oxide, i.e., with $Al_2O_3$. As an alternative or in addition, in further embodiments the ceramic particles may also be particles of magnesium oxide and/or yttrium oxide and/or aluminum nitride and/or boron nitride. As an alternative or in addition, the ceramic particles may include YAG particles and/or mica particles.

In the embodiment illustrated, the size distribution of the ceramic particles is a bimodal size distribution, i.e., there are smaller ceramic particles 80, in the sense of a fine fraction of the ceramic particles, that act as sintering inhibitors between green bodies 20, and there are coarser ceramic particles 80 that may act as spacers between green bodies 20 and allow electrical insulation between magnetic laminations manufactured from the green bodies 20.

In further, not specifically illustrated embodiments, the ceramic particles may have a whisker- or platelet-shaped form. In further, not specifically shown embodiments, instead of a suspension with the ceramic particles a green film with ceramic particles may also be applied to the green body 20.

The ceramic particles 80 form a separating layer that has a thickness of less than 10 micrometers and covers more than 75 percent of the flat sides of the green blank 20.

In the embodiment illustrated, the ceramic particles 80 have been applied by the suspension 70, that firstly is dried, and therefore the carrier liquid of the suspension 70 may evaporate.

Then, as illustrated in FIG. 3, the substrate 30 with the green body 20 with the ceramic particles 80 (not illustrated explicitly in FIGS. 3 to 7) is rotated by a rotation 90 by 60 degrees, that is to say by 360°/n for an n-fold rotational symmetry. The rest of the arrangement, for instance the nozzle 40 for the printing paste 10 and the nozzle 60 for the suspension 70, remains unchanged from the original arrangement of FIGS. 1 and 2. In the method, the correct rotation may be checked by the rotation of the orientation marking 50, that in the embodiment illustrated consequently likewise has to be rotated further by 60°.

Figure 4:
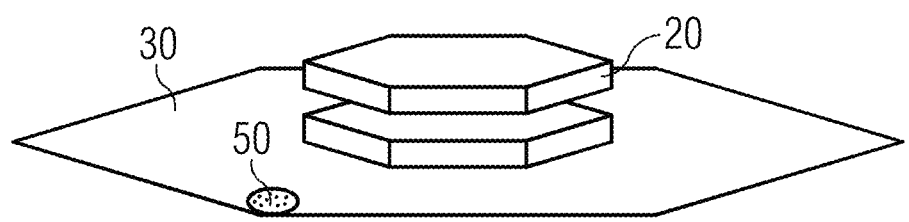
FIG. 4 schematically depicts a perspective illustration of a further step of the method, in which a further green blank is printed onto the first green blank after the method steps as per FIGS. 1 and 2 according to an embodiment.

After the rotation 90 by 60 degrees, a further green body 20 as shown in FIG. 4, that has the same geometric form as the green body 20 previously printed on the substrate 30, is printed onto the separating layer formed with ceramic particles 80. In this case, the green body 20 is printed in such a way that it precisely covers the green body 20 previously printed on the substrate 30 as viewed in a direction perpendicular to the planar extents of the substrate 30. After that, once again a separating layer with ceramic particles 80 is applied to this further green body 20 and dried. This is performed as already explained on the basis of FIG. 2.

Figure 5:
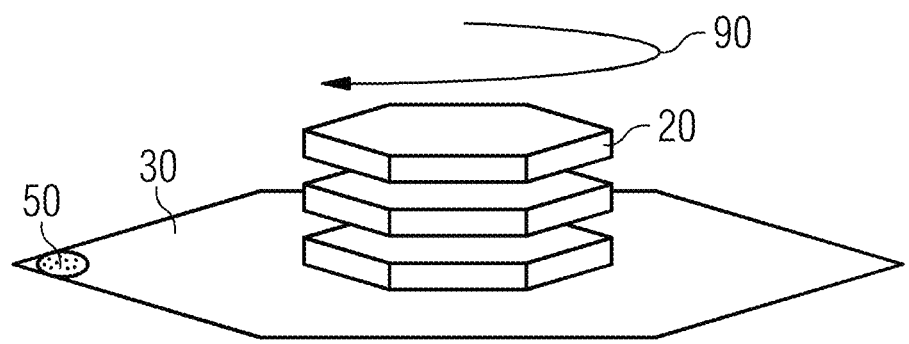
FIG. 5 schematically depicts a perspective illustration of a further step of the method, in which a further green blank is printed onto the existing green blanks after the method steps as per FIGS. 1 and 2 according to an embodiment.
Figure 6:
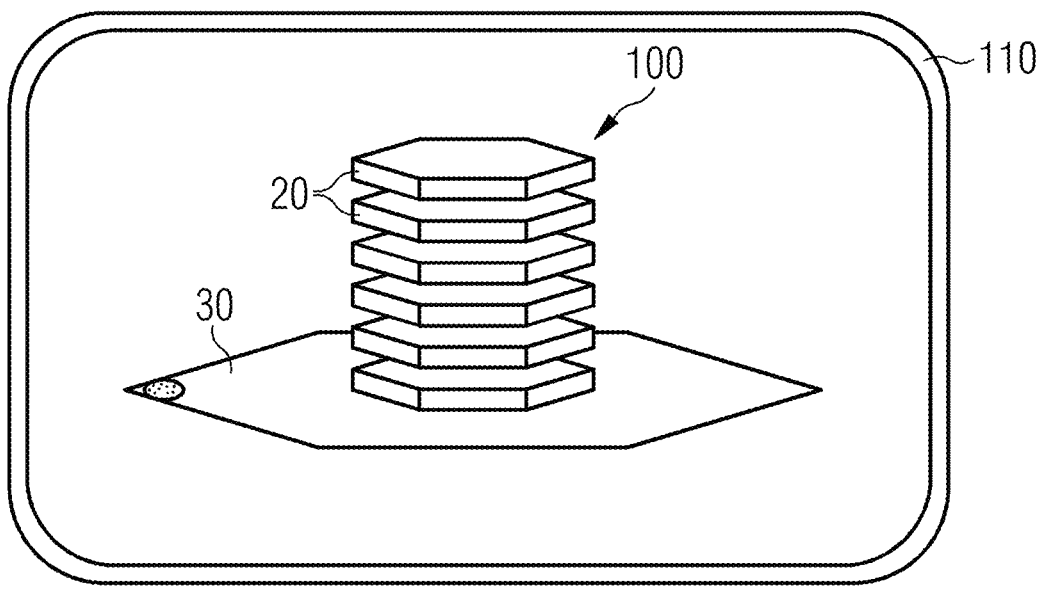
FIG. 6 depicts a further step of the method, in which the green blanks printed in the method steps as per

Subsequently, as illustrated on the basis of FIG. 5, the substrate 30 with the green bodies 20 is rotated once again by 60 degrees and a further green body 20 is applied to the ceramic layer located on the uppermost green body 20 and a separating layer is sprayed on.

In this way, movement is continued until a predefined number of green bodies 20 has been deposited one on top of another. As described previously, the arrangement of already printed green bodies 20 is rotated by an angle of 60° before a new green body 20 is printed. After the last printing of a green body 20, a further application of a separating layer with ceramic particles 80 is omitted.

In this way, the green bodies 20, that are printed one on top of another and are respectively separated from one another by separating layers with ceramic particles 80, form a stack 100 of green bodies 20. The stack 100 of green bodies 20 that is formed in this way, now jointly in the form of a stack 100 has the binder removed and is sintered in a sintering oven 110. In this way, the green bodies 20 are sintered to form a stack 100 of magnetic laminations.

It is optionally possible for the ceramic particles 80 between the magnetic laminations to be removed in a further step.

It is optionally possible for the stack 100 to be dipped in resin, with the result that in the stack 100 of magnetic laminations the individual magnetic laminations are reliably electrically insulated from one another and the stack 100 is mechanically secured.

The stack 100 is then provided with a shaft (not shown explicitly) in a manner known per se, and therefore it forms a rotor 120. The rotor 120 is installed in a manner known per se together with a stator 130 to form a machine 140 manufactured, that in the embodiment shown is an electric motor manufactured. As an alternative or in addition, the machine 140 manufactured may form an electric generator.

Figure 7:
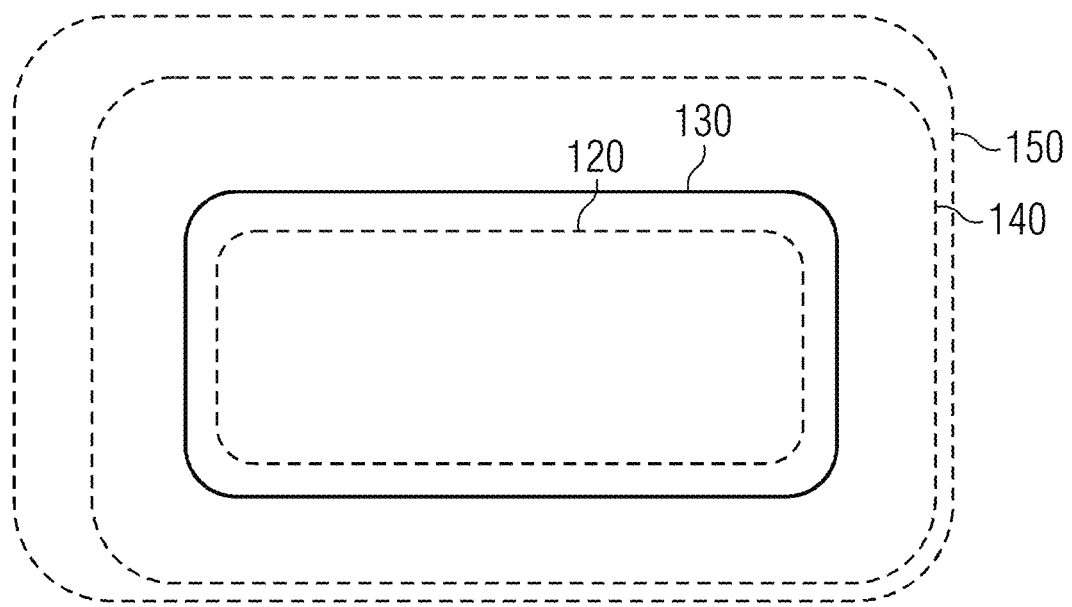
FIG. 7 depicts a final step of the method, in which the stack of magnetic laminations manufactured during the method steps as per

The installation 150 illustrated in FIG. 7 is an industrial installation, that includes the electric machine 140 manufactured. As an alternative, instead of an installation 150, an autonomous stock vehicle that includes the electric machine 140 manufactured may be present.

It is to be understood that the elements and features recited in the embodiments may be combined in different ways to produce new embodiments that likewise fall within the scope of the present invention. Thus, whereas the dependent claims depend from only a single independent or dependent claim, it is to be understood that the dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for manufacturing an electric machine including a stack of magnetic laminations, the method comprising:
   printing a first green blank of the stack of magnetic laminations; wherein green blanks of the stack of magnetic laminations include an n-fold rotational symmetry;
   applying a first separating layer to the first green blank;
   rotating the first green blank by an angle of 360°/n or by a multiple of the angle;

printing at least a second green blank of the stack of magnetic laminations onto the first separating layer of the first green blank; and jointly sintering at least the first green blank and the second green blank of the stack of magnetic laminations.

2. The method of claim 1, further comprising:

applying a second separating layer to the second green blank of the stack of magnetic laminations; and printing at least one further green blank of the stack of magnetic laminations onto the second green blank.

3. The method of claim 1, wherein the first green blank and the second green blank are printed by screen printing, stencil printing, or screen printing and stencil printing.

4. The method of claim 1, wherein the first separating layer is at least one of formed with ceramic particles, applied with a green-blank coverage of at least 75 percent, formed with aluminum oxide, formed with yttrium oxide, formed with magnesium oxide, formed with aluminum nitride, formed with boron nitride, formed with YAG materials, or formed with mica materials.

5. The method of claim 1, wherein applying the separating layer comprises applying by a suspension, wherein the suspension is dried before a further green blank is printed.

6. The method of claim 1, further comprising sintering the stack of magnetic laminations to form the stack of magnetic laminations.

7. The method of claim 1, further comprising:

introducing resin between magnetic laminations of the stack of magnetic laminations, wherein the resin electrically insulates the magnetic laminations from one another.

8. The method of claim 1, further comprising:

forming a rotor, a stator, or the rotor and the stator of the electric machine with the stack of magnetic laminations.

* * * * *